(12) United States Patent
Shao

(10) Patent No.: US 12,320,401 B2
(45) Date of Patent: Jun. 3, 2025

(54) REINFORCED COIL SPRING OF A HOSE REEL

(71) Applicant: YONGKANG HAILI INDUSTRIAL Co., Ltd., Zhejiang (CN)

(72) Inventor: Yujun Shao, Zhejiang (CN)

(73) Assignee: YONGKANG HAILI INDUSTRIAL CO., LTD., Yongkang (CN)

( * ) Notice: Subject to any disclaimer, the term of this patent is extended or adjusted under 35 U.S.C. 154(b) by 0 days.

(21) Appl. No.: 17/777,941

(22) PCT Filed: Aug. 26, 2021

(86) PCT No.: PCT/CN2021/114712
§ 371 (c)(1),
(2) Date: Jan. 12, 2023

(87) PCT Pub. No.: WO2023/279500
PCT Pub. Date: Jan. 12, 2023

(65) Prior Publication Data
US 2024/0167528 A1 May 23, 2024

(30) Foreign Application Priority Data
Jul. 9, 2021 (CN) .......................... 202110777416.4

(51) Int. Cl.
*F16F 1/12* (2006.01)
*B65H 75/48* (2006.01)
*F16F 1/10* (2006.01)
(52) U.S. Cl.
CPC ............... *F16F 1/12* (2013.01); *B65H 75/48* (2013.01); *F16F 2238/022* (2013.01)

(58) Field of Classification Search
CPC ...... F16F 1/12; F16F 1/10; F16F 1/123; F16F 1/13; F16F 2238/022; B65H 75/48
See application file for complete search history.

(56) References Cited

U.S. PATENT DOCUMENTS 3,625,502 A * 12/1971 Joerres ...................... F16F 1/10
267/167
6,929,209 B2 * 8/2005 Baumgarten .......... B65H 75/48
242/379
(Continued)

FOREIGN PATENT DOCUMENTS

CH          706653 A2    12/2013
CN        104879408 A     9/2015
(Continued)

*Primary Examiner* — Thomas W Irvin
(74) *Attorney, Agent, or Firm* — Fideli Law PLLC; Qiang Li

(57) ABSTRACT

The reinforced coil spring of a hose reel includes a steel leaf spring being arranged on an inside surface of the outermost spring-coil. An outer end tip of the steel leaf spring and the outermost spring-coil are fixedly connected, and an inner end tip of the steel leaf spring is located between the outermost spring-coil and a second-outer spring-coil. The steel leaf spring added in the reinforced coil spring of a hose reel can not only enhance the tightening force of the outermost spring-coil of the coil spring, but avoid increasing the maximum pullout force of the coil spring, while achieving low production cost. The ear hook in the reinforced coil spring of a hose reel has better overall strength, and an opening of the ear hook is less prone to expanding during use.

13 Claims, 2 Drawing Sheets

(56) References Cited

U.S. PATENT DOCUMENTS

| | | | |
|---|---|---|---|
| 10,549,946 B2 * | 2/2020 | Pedoeem | B65H 75/4431 |
| 10,704,633 B2 * | 7/2020 | Xu | F16M 11/046 |
| 10,858,217 B2 * | 12/2020 | Poutiainen | B65H 75/4471 |
| 10,876,678 B2 * | 12/2020 | Qu | F16F 1/123 |
| 11,214,462 B2 * | 1/2022 | Pedoeem | B65H 75/4431 |
| 2005/0011981 A1 * | 1/2005 | Baumgarten | B65H 75/48 |
| | | | 242/379 |
| 2011/0156328 A1 * | 6/2011 | Nicolio | F16F 1/10 |
| | | | 267/156 |
| 2019/0202655 A1 * | 7/2019 | Pedoeem | B65H 75/4471 |
| 2019/0383342 A1 * | 12/2019 | Xu | F16M 11/24 |
| 2020/0232595 A1 * | 7/2020 | Qu | F16F 1/025 |

FOREIGN PATENT DOCUMENTS

| | | |
|---|---|---|
| CN | 205244222 U | 5/2016 |
| CN | 106195085 A | 12/2016 |
| CN | 205956275 U | 2/2017 |
| CN | 106829651 A | 6/2017 |
| FR | 3088396 A1 | 5/2020 |
| JP | S5697646 A | 8/1981 |

\* cited by examiner

REINFORCED COIL SPRING OF A HOSE REEL

CROSS-REFERENCE TO RELATED APPLICATIONS

This application claims priority to Chinese patent application No. 202110777416.4, filed to the China National Intellectual Property Administration on 9 Jul. 2021 and entitled "REINFORCED COIL SPRING OF A HOSE REEL", the disclosure of which is hereby incorporated by reference in its entirety. See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention belongs to the technical field of coil springs, and relates to a reinforced coil spring of a hose reel, which can not only enhance a tightening force of an outermost spring-coil (101), but also avoid increasing a maximum pullout force of the coil spring, and improve a using effect of an ear hook, while achieving low production cost and facilitating production.

2. Description of Related Art Including Information Disclosed Under 37 CFR 1.97 and 37 CFR 1.98

A hose reel is also referred to as a winder, a wire reel, a reel, and a reel drum, which has wide applications, and can be applied in various production and assembly workshops, maintenance workshops, automobile care shops, automobile 4S shops and other workplaces. The applicant is an enterprise specializing in production of hose reels, and has more than ten years of experience in research and development of hose reels. There are dozens of patents related to hose reels, such as the invention patent CN 106829651 A, entitled "Electric Hose Reel" under the name of the applicant.

A coil spring is one of core components of a hose reel. The structure of the existing mainstream coil spring, such as CN 06195085 A, entitled "Spiral Spring", includes a spring coil. The spring coil is formed by uniformly coiling a spring leaf, and further includes a fixed end, a mounting hole, and a spring clip. The fixed end is located at a center position of the spring coil and the fixed end is a circular structure. During installation, the fixed end sleeves a gear shaft of a drilling and milling machine. The mounting hole is machined at the fixed end. The fixed end is fixed on the gear shaft by a screw passing through the mounting hole. The spring clip is arranged on the left side of an outer circle of the spring coil, and the spring clip is inserted and fastened in a clamping slot in a spring holder hole during installation. The spring coil is formed by coiling a long-strip quenched steel spring leaf, and its hardness value can reach HRC45-50. All sharp edges of the spring coil are chamfered to 0.5×45°. The mounting hole is a combination of a round hole and a rectangular hole. An end portion of the spring clip is designed into a circular-arc shape. Such a structure has the disadvantages: when the coil spring is retracted, a reeling force of an outermost spring-coil (101) is small, which causes the problem that a tail end of the coil spring cannot be tightened when the coil spring is reeled, resulting in an influence on a using effect of a hose reel.

The existing solution to the above problem is to use a coil spring leaf with a suitable thickness to make a coil spring, so that the outermost spring-coil (101) of the coil spring has an appropriate tightening force (when coil springs are made of the same material, a reeling force of each coil spring is related to a thickness of the coil spring, and the reeling force of the coil spring will increase with an increase of the thickness of the coil spring). Although this solution solves the problem that the tail end of the coil spring cannot be tightened when the coil spring is reeled, a new problem arises, that is, when a hose or wire is pulled out from the hose reel, a restoring force of the coil spring is increased as the hose or wire is pulled further back. At this point, a pullout force required is also greater, which wastes time and labor during pulling of the hose or wire. Moreover, due to long-term tension resistance, mechanical fatigue is easy to be caused to the hose or wire itself and the coil spring itself, thereby leading to shortening of service lives of the hose or wire, and the hose reel. In addition, the spring clip (i.e., an ear hook) in the existing coil spring will be deformed as the mechanical fatigue increases due to the tension resistance, resulting in an influence on a using effect of the coil spring.

BRIEF SUMMARY OF THE INVENTION

A design objective is: in order to avoid defects of the background art, a reinforced coil spring of a hose reel is designed, which can not only enhance a tightening force of an outermost spring-coil 101, but also avoid increasing a maximum pullout force of the coil spring, and improve a using effect of an ear hook, while achieving low production cost and facilitating production.

Design solutions for achieving the above design objective are as follows.

1. One of the technical features of the present invention refers to a design that a steel leaf spring is arranged on an inside surface of the outermost spring-coil, an outer end tip of the steel leaf spring and the outermost spring-coil are fixedly connected, and an inner end tip of the steel leaf spring is located between the outermost spring-coil and a second-outer spring-coil. The objective of this design is as follows. First, since a steel leaf spring is arranged on an inside surface of the outermost spring-coil, the outermost spring-coil of the coil spring has a good reeling force during retraction to ensure tightening of the coil spring, and because other sections in the coil spring are not thickened, a maximum pullout force needed for pulling out a hose or wire is not increased, which saves time and force in use of the hose reel, and moreover, due to small mechanical fatigue in long-term use of the hose or cable, service life of the hose reel is prolonged, and in addition, production cost is lowered. Second, since an outer end tip of the steel leaf spring and the outermost spring-coil are fixedly connected, and an inner end tip of the steel leaf spring is located between the outermost spring-coil and a second-outer spring-coil, that is, one end of the steel leaf spring is fixed while the other end is movable, a fitting degree between the movable end of the spring leaf spring and the inside surface of the outermost spring-coil can be freely adjusted when the coil spring is reeled or unreeled; compared with overall fastening between the spring leaf spring and the outermost spring-coil, adjustment of the tightening force of the outermost spring-coil has a gradually changing process, so that overall tightening of the coil spring can be realized, and a tightening process of the outermost spring-coil is relatively gentle.

2. A second technical feature of the present invention refers to a design that an steel leaf spring extension section with a certain length is reserved between a riveted position of the rivet and an outer end surface of the steel leaf spring, the ear hook is composed of an arc-shaped plate section and two flat plate sections, the arc-shaped plate section is located between the two flat plate sections, and the steel leaf spring extension section closely fits a back surface of one of the flat plate sections. The objective of this design is as follows. A steel leaf spring extension section with a certain length is reserved between a riveted position of the rivet and an outer end surface of the steel leaf spring, the ear hook is composed of an arc-shaped plate section and two flat plate sections, the arc-shaped plate section is located between the two flat plate sections, and the steel leaf spring extension section closely fits a back surface of one of the flat plate sections. As the flat plate section is a section connected to a body of the coil spring leaf, the steel leaf spring extension section has an effect of thickening this flat plate section, and thus enhancing an elastic force of the ear hook during retraction, and further improving reeling quality of the coil spring.

3. A third technical feature of the present invention refers to a design that the steel leaf spring and the outermost spring-coil are fixedly connected through one or a plurality of rivets, the steel leaf spring is provided with a plurality of first riveting holes, the back surface of the steel leaf spring is provided with a positioning protrusion, the positioning protrusion is located among the plurality of first rivets, the outermost spring-coil is provided with a plurality of second riveting holes, the outermost spring-coil is provided with a positioning hole, the positioning hole is located among the plurality of second riveting holes, the positioning hole is a square hole, and the positioning protrusion is square. The objective of this design is as follows. The steel leaf spring and the outermost spring-coil are fixedly connected through one or a plurality of rivets, the steel leaf spring is provided with a plurality of first riveting holes, the back surface of the steel leaf spring is provided with a positioning protrusion, the positioning protrusion is located among the plurality of first rivets, the outermost spring-coil is provided with a plurality of second riveting holes, the outermost spring-coil is provided with a positioning hole, the positioning hole is located among the plurality of second riveting holes, the positioning hole is a square hole, and the positioning protrusion is square. First, after the positioning protrusion and the positioning hole are in concave-and-convex fit, the first riveting holes on the steel leaf spring and the corresponding second riveting holes on the outermost spring-coil are through one to one correspondingly, which facilitates a subsequent quick riveting operation. Second, the positioning protrusion is located among the plurality of first riveting holes and the positioning hole is located among the plurality of second riveting holes, so that the positioning protrusion will not affect the use of the coil spring after riveting; in addition, such a structural arrangement can not only improve a riveting firmness therebetween, but also ensure that a non-fixed end of the steel leaf spring can be straightly arranged between the outermost spring-coil and a second-outer spring-coil.

4. A fourth technical feature of the present invention refers to a design that the arc-shaped plate section of the ear hook is provided with two stamped ribs, the stamped ribs are arranged in a width direction of the arc-shaped plate, and the stamped ribs each have a W-shaped cross section. The objective of this design is as follows. First, the arc-shaped plate section of the ear hook is provided with two stamped ribs, the stamped ribs are arranged in a width direction of the arc-shaped plate, and because the stamped ribs can improve a strength of the arc-shaped plate section, the ear hook will not be deformed (an opening of the ear hook is widened, which will affect a using effect of the coil spring) after long-term use; moreover, the two stamped ribs are distributed at two sides of a top end of the arc-shaped plate section and protrude to the outside of the ear hook, so as to be able to counteract external forces from different directions and enhance the arc-shaped plate section in all directions. Second, the stamped ribs each have a W-shaped cross section, and the ear hook has an arc-shaped cross section, and protrudes to the outside, so that the stamped ribs are arranged on the outer side of the ear hook; with a bending structure of the stamped ribs, a strength at a bending portion of the arc-shaped plate section can be further improved, and a restoring force of the arc-shaped plate section can also be enhanced.

5. A fifth technical feature of the present invention refers to a design that the outer end tip of the steel leaf spring is bent to form an ear hook reinforced portion, an inner surface of the ear hook reinforced portion closely fits an outer surface of the ear hook, and an end tip of the ear hook reinforced portion is an inwardly rolled end tip that clasps a head of the ear hook. The objective of this design is as follows. First, the outer end tip of the steel leaf spring is bent to form an ear hook reinforced portion and an inner surface of the ear hook reinforced portion closely fits an outer surface of the ear hook so that overall strength and restoring elastic force of the ear hook can be enhanced, thereby improving the using effect of the coil spring. Second, an end tip of the ear hook reinforced portion is an inwardly rolled end tip that clasps a head of the ear hook and the other side is fixed with a rivet, so that bonding fastness and bonding tightness of the ear hook and the ear hook reinforced portion can be improved.

The technical solution includes: a reinforced coil spring of a hose reel includes a coil spring formed by coiling a coil spring leaf, an outer end tip of the coil spring is bent to form an ear hook, an opening of the ear hook is located on an outer side of an outermost spring-coil, a steel leaf spring is arranged on an inside surface of the outermost spring-coil, an outer end tip of the steel leaf spring and the outermost spring-coil are fixedly connected, and an inner end tip of the steel leaf spring is located between the outermost spring-coil and a second-outer spring-coil.

Compared with the background art, the present invention has the advantages: first, the steel leaf spring added in the reinforced coil spring of a hose reel can not only enhance the tightening force of the outermost spring-coil of the coil spring, but avoid increasing the maximum pullout force of the coil spring, while achieving low production cost; and second, the ear hook in the reinforced coil spring of a hose reel has better overall strength, and the opening of the ear hook is less prone to expanding during use.

DETAILED DESCRIPTION OF THE INVENTION

Figure 1:
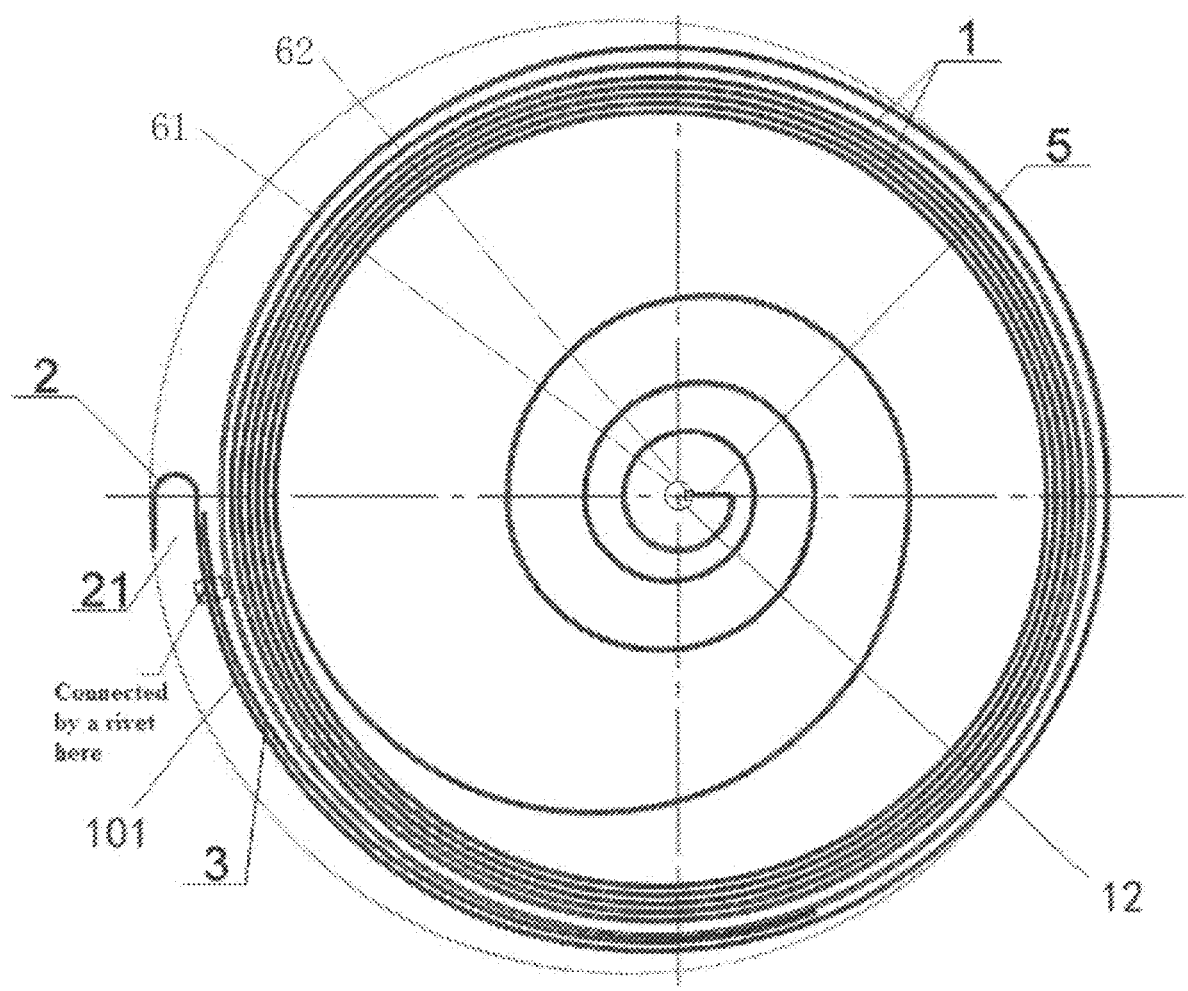
FIG. 1 is a schematic view of a structural diagram of a reinforced coil spring of a hose reel.
Figure 2:
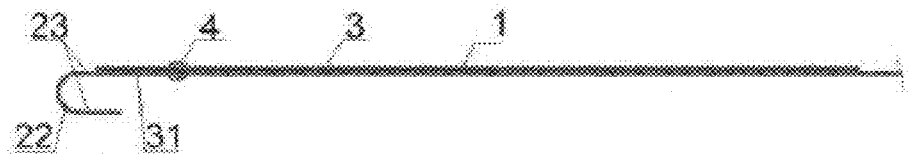
FIG. 2 is a schematic view of a diagram of a partial structure of a reinforced coil spring of a hose reel.

Embodiment 1: Referring to FIG. 1 to FIG. 2, a reinforced coil spring of a hose reel induces a coil spring 1 formed by coiling a coil spring leaf, an outer end tip of the coil spring 1 is bent to form an ear hook 2, and an opening 21 of the ear hook 2 is located on an outer side of an outermost spring-coil 101. A steel leaf spring 3 is arranged on an inside surface of the outermost spring-coil 101, an outer end tip of the steel leaf spring 3 and the outermost spring-coil 101 are fixedly connected, and an inner end tip of the steel leaf spring 3 is located between the outermost spring-coil 101 and a second-outer spring-coil; that is, only the outer end tip of the steel leaf spring 3 is fixedly connected to the outermost spring-coil 101. Preferably, a length of the steel leaf spring 3 is a quarter of a length of the outermost spring-coil 101. The arrangement of the steel leaf spring 3 with this length, width, and thickness has an effect of thickening the outermost spring-coil 101, and makes the outermost spring-coil 101 have a proper retraction elastic force during retraction of the coil spring, thereby ensuring that overall tightening of the outermost spring-coil 101 of the coil spring 1 can be realized effectively while the steel leaf spring 3 is installed in a most labor-saving and time-saving manner. The outer end tip of the steel leaf spring 3 is riveted to the outermost spring-coil 101 through a rivet 4, a thickness and a width of the steel leaf spring 3 match a thickness and a width of the outermost spring-coil 101, and the steel leaf spring 3 may be made of the same material as the coil spring leaf.

An steel leaf spring extension section 31 with a certain length is reserved between a riveted position of the rivet 4 and an outer end surface of the steel leaf spring 3, the ear hook 2 is composed of an arc-shaped plate section 22 and two flat plate sections 23, the arc-shaped plate section 22 is located between the two flat plate sections 23, the outer end tip of the outermost spring-coil 101 is bent by means of a bending device so as to form the arc-shaped plate section 22 and the two flat plate sections 23, and the steel leaf spring extension section 31 closely fits a back surface of one of the flat plate sections 23. The flat plate section 23 is a section connected to a body of the coil spring leaf, and the steel leaf spring extension section 31 has an effect of thickening the flat plate section 23, thereby enhancing an elastic force of the ear hook 2 during retraction.

An inner end tip of the coil spring 1 is bent to form a hook head 5. A flat plate of the hook head 5 is located on a diameter line of a round fixed end tip, and a gap is reserved between an outer end surface of the flat plate and the center of a circle of the round fixed end tip, so that the flat plate in the hook head 5 and a groove of a fixed shaft can be in concave-and-convex fit after the fixed shaft is in insertion fit with the round fixed end tip, thereby avoiding relative slipping between the fixed shaft and the coil spring 1 during use, and ensuring a using effect of the coil spring.

Figure 3:
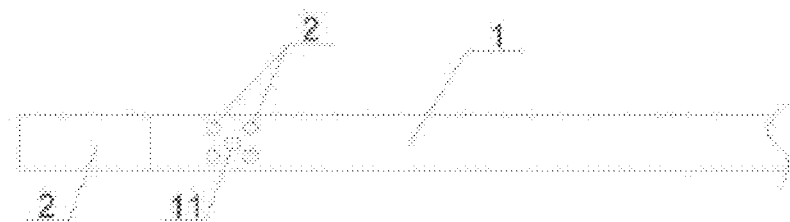
FIG. 3 is a schematic view of a diagram of a partial structure of a coil spring.
Figure 4:
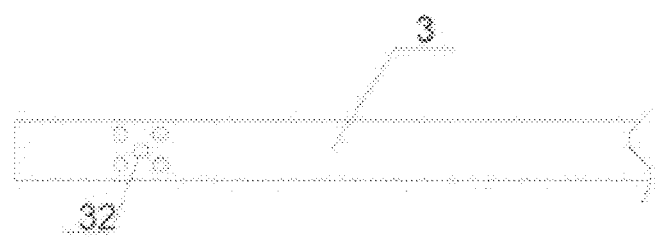
FIG. 4 is a schematic view of a diagram of a partial structure of a steel leaf spring.
Figure 5:
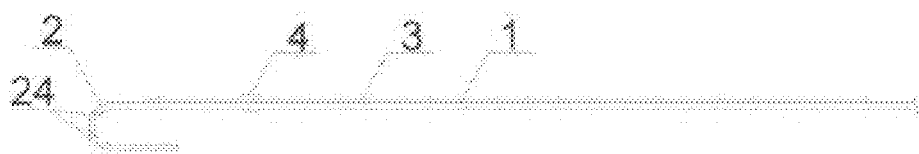
FIG. 5 is a schematic view of a diagram of a partial structure of a reinforced coil spring (provided with stamped ribs) of a hose reel.

Embodiment 2: Referring to FIG. 3 to FIG. 5 on the basis of Embodiment 1, the steel leaf spring 3 and the spring leaf are fixedly connected through one or a plurality of rivets 4, the steel leaf spring 3 is provided with a plurality of first riveting holes, the back surface of the steel leaf spring 3 is provided with a positioning protrusion 32, the positioning protrusion 32 is located among the plurality of first rivets, the outermost spring-coil 101 is provided with a plurality of second riveting holes, the outermost spring-coil 101 is provided with a positioning hole 11, the positioning hole 11 is located among the plurality of second riveting holes, the positioning hole 11 is a square hole, and the positioning protrusion 32 is square. A size of the square hole matches a size of the square positioning protrusion 32. After the positioning protrusion 32 and the positioning hole 11 are in concave-and-convex fit, the first riveting holes on the steel leaf spring 3 and the corresponding second riveting holes on the outermost spring-coil 101 are through one to one correspondingly, which facilitates a quick and convenient riveting operation therebetween. After the steel leaf spring 3 and the outermost spring-coil 101 are riveted through the rivet 4, a length of a portion of the positioning protrusion 32 exposed from the outermost spring-coil 101 is less than a length of a rivet head, so that an overall thickness of an overlap of the outermost spring-coil 101 and the steel leaf spring 3 is small and is controlled effectively. In addition, the positioning protrusion 32 is located among the plurality of first riveting holes and the positioning hole 11 is located among the plurality of second riveting holes, so that the positioning protrusion 32 will not affect the use of the coil spring after riveting. Since the second riveting holes and the positioning hole 11 are formed on the outermost spring-coil 101, a strength of the outermost spring-coil 101 is affected, and a breakage of the outermost spring-coil may be caused after long-term retraction. Therefore, since the positioning hole 11 is formed among the plurality of second riveting holes, riveted positions of the steel leaf spring 3 and the outermost spring-coil 101 surround the positioning hole 11, and under the cooperation of a reinforcing effect obtained after the positioning hole 11 and the positioning protrusion 32 are matched and a connection strengthening effect of the rivet, a structural strength of a joint between the outermost spring-coil 101 and the steel leaf spring 3 is higher, thereby effectively preventing the outermost spring-coil 101 from cracking during retraction. Preferably, the number of the rivets 4 is four, and the four rivets 4 are arranged in a square shape. The positioning protrusion 32 and the positioning hole 11 that are in concave-and-convex fit are located in the middle of the four rivets 4. The advantage of this arrangement is that it can not only improve the riveting firmness of the two, but also ensure that a non-fixed end of the steel leaf spring 3 can be straightly arranged between the outermost spring-coil 101 and a second-outer spring-coil (to avoid affecting the subsequent assembling of the coil spring due to skewing in installation of the steel leaf spring 3).

The arc-shaped plate section 22 of the ear hook 2 is provided with two stamped ribs 24, the stamped ribs 24 are arranged along a width direction of the arc-shaped plate section 22, the two stamped ribs 24 are distributed at two sides of a top end of the arc-shaped plate section 22, the stamped ribs 24 each have a W-shaped cross section, and the stamped ribs 24 protrude to the outside of the ear hook 2.

The arc-shaped plate section 22 of the ear hook 2 is provided with two stamped ribs 24, the stamped ribs 23 are arranged in a width direction of the arc-shaped plate 22, and because the stamped ribs 23 can improve a strength of the arc-shaped plate section 22, the ear hook 2 will not be deformed (an opening of the ear hook is widened, which will affect the using effect of the coil spring) after long-term use. Moreover, the two stamped ribs 23 are distributed at two sides of a top end of the arc-shaped plate section 22, and the stamped ribs 23 protrude to the outside of the ear hook 2, so as to be able to counteract external forces from different directions and enhance the arc-shaped plate section 22 in all directions. Second, the stamped ribs 23 each have a W-shaped cross section, and the ear hook 2 has an arc-shaped cross section, and protrudes to the outside, so that the stamped ribs 23 are arranged on the outer side of the ear hook 2. With a bending structure of the stamped ribs 23, a strength at a bending portion of the arc-shaped plate section 22 can be further improved, and a restoring force of the arc-shaped plate section 22 can also be enhanced.

Figure 6:
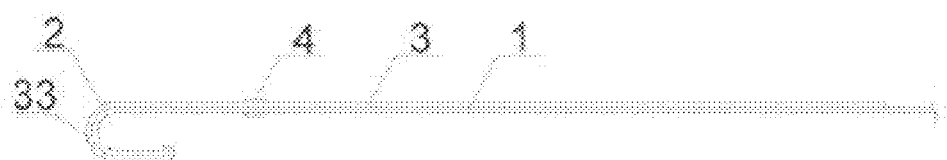
FIG. 6 is a schematic view of a diagram of a partial structure of a reinforced coil spring (provided with an ear hook reinforced portion) of a hose reel.

Embodiment 3: Referring to FIG. 6 on the basis of Embodiment 1 and Embodiment 2, the outer end tip of the steel leaf spring 3 is bent to form an ear hook reinforced portion 33, an inner surface of the ear hook reinforced portion 33 closely fits an outer surface of the ear hook 2, and an end tip of the ear hook reinforced portion 33 is an inwardly rolled end tip that clasps a head of the ear hook 2. After the coil spring 1 is formed by coiling the coil spring leaf, the steel leaf spring 3 and the outermost spring-coil 101 are riveted, with an outer end surface of the steel leaf spring 3 extending out of an outer end surface of the outermost spring-coil 101, and then the outer end tip pf the steel leaf spring 3 and the outer end tip of the outermost spring-coil 101 are bent together by means of a bending device to form the ear hook 2 and the ear hook reinforced portion 33. Then, the end tip of the ear hook reinforced portion 33 is crimped to clasp a head of the ear hook 2.

In Embodiment 4, the steel leaf spring 3 is provided with a plurality of first riveting holes, the back surface of the steel leaf spring 3 is provided with a positioning protrusion 32, the positioning protrusion 32 is located among the plurality of first riveting holes, the outermost spring-coil 101 is provided with a plurality of second riveting holes, the outermost spring-coil 101 is provided with a positioning hole 11 matched with the positioning protrusion 32, and the positioning hole 11 is located among the plurality of second riveting holes.

In Embodiment 5, the arc-shaped plate section 22 of the ear hook 2 is provided with two stamped ribs 24, and the stamped ribs 24 are arranged along a width direction of the arc-shaped plate section 22.

In Embodiment 6, an outer end tip of the steel leaf spring 3 is bent to form an ear hook reinforced portion 33, and an inner surface of the ear hook reinforced portion 33 closely fits an outer surface of the ear hook 2.

In Embodiment 6, referring to FIG. 1, a round fixed end tip 12 that is used to be in insertion fit with a fixed shaft is formed at an inner end of the coil spring 1, and an inner end tip of the coil spring 1 is bent to form a hook head 5; the hook head 5 includes a flat plate, the flat plate is located on a diameter line of the round fixed end tip 12, and a gap is reserved between an outer end surface of the flat plate and the center of a circle of the round fixed end tip 12, so that the flat plate and a groove of the fixed shaft are in concave-and-convex fit after the fixed shaft is in insertion fit with the round fixed end tip 12.

In Embodiment 7, an outer end tip of the steel leaf spring 3 and the outermost spring-coil 101 are fixedly connected through a fastener.

A steel leaf spring extension section 31 with a certain length is reserved between a fixed position of the fastener and an outer end surface of the steel leaf spring 3, the ear hook 2 is composed of an arc-shaped plate section 22 and two flat plate sections 23, the arc-shaped plate section 22 is located between the two flat plate sections 23, and the steel leaf spring extension section 31 closely fits a back surface of one of the flat plate sections 23.

In this embodiment, a connection structure of the outermost spring-coil 101 and the steel leaf spring 3 is adjusted on the basis of Embodiment 1. In Embodiment 1, the rivet is used for connection. In this embodiment, a fastener is used to realize the connection therebetween. The fastener here is not limited to the rivet, and any structure that can realize the fastening between two members, such as a screw and welding can be used.

In Embodiment 8, on the basis of Embodiment 1, a first riveting hole and a second riveting hole are adjusted to be a first fixed point and a second fixed point. The steel leaf spring 3 is provided with a plurality of first fixed points, the back surface of the steel leaf spring 3 is provided with a positioning protrusion 32, the positioning protrusion 32 is located among the plurality of first fixed points, the outermost spring-coil 101 is provided with a plurality of second fixed points, the outermost spring-coil 101 is provided with a positioning hole 11 matched with the positioning protrusion 32, and the positioning hole 11 is located among the plurality of second fixed points.

Under the cooperation of a reinforcing effect obtained after the positioning hole 11 and the positioning protrusion 32 are matched and a connection strengthening effect of the first fixed points and the second fixed points, a structural strength of a joint between the outermost spring-coil 101 and the steel leaf spring 3 is higher, thereby effectively preventing the outermost spring-coil 101 from cracking during retraction.

It is to be understood that although detailed textual descriptions to a design idea of the present invention are made through the above embodiments, these textual descriptions are merely simple textual descriptions of the design idea of the present invention rather than a limitation to the design idea of the present invention, and any combination, addition or modification that does not exceed the design idea of the present invention all fall within the scope of protection of the present invention.

I claim:

1. A reinforced coil spring of a hose reel, comprising: a coil spring formed by coiling a coil spring leaf,
   an outer end tip of the coil spring being bent to form an ear hook, and
   an opening of the ear hook being located on an outer side of an outermost spring-coil,
   wherein a steel leaf spring is arranged on an inside surface of the outermost spring-coil, an outer end tip of the steel leaf spring and the outermost spring-coil are fixedly connected, and wherein an inner end tip of the steel leaf spring is located between the outermost spring-coil and a second-outer spring-coil;

wherein the steel leaf spring is provided with a plurality of first riveting holes, wherein the back surface of the steel leaf spring is provided with a positioning protrusion, wherein the positioning protrusion is located among the plurality of first riveting holes, wherein the outermost spring-coil is provided with a plurality of second riveting holes, wherein the outermost spring-coil is provided with a positioning hole matched with the positioning protrusion, and wherein the positioning hole is located among the plurality of second riveting holes.

2. The reinforced coil spring, as claimed in claim 1, wherein the outer end tip of the steel leaf spring is riveted to the outermost spring-coil through a rivet, and wherein a thickness and a width of the steel leaf spring match a thickness and a width of the outermost spring-coil.

3. The reinforced coil spring, as claimed in claim 2, wherein a steel leaf spring extension section with a certain length is reserved between a riveted position of the rivet and an outer end surface of the steel leaf spring, wherein the ear hook is comprised of an arc-shaped plate section and two flat plate sections, wherein the arc-shaped plate section is located between the two flat plate sections, and wherein the steel leaf spring extension section closely fits a back surface of one of the flat plate sections.

4. The reinforced coil spring, as claimed in claim 3, wherein the arc-shaped plate section of the ear hook is provided with two stamped ribs, wherein the stamped ribs are arranged along a width direction of the arc-shaped plate section, and wherein the stamped ribs each have a W-shaped cross section.

5. The reinforced coil spring, as claimed in claim 3, wherein the arc-shaped plate section of the ear hook is provided with two stamped ribs, and wherein the stamped ribs are arranged along a width direction of the arc-shaped plate section.

6. The reinforced coil spring, as claimed in claim 2, wherein the outer end tip of the steel leaf spring is bent to form an ear hook reinforced portion, wherein an inner surface of the ear hook reinforced portion closely fits an outer surface of the ear hook, and wherein an end tip of the ear hook reinforced portion is an inwardly rolled end tip that clasps a head of the ear hook.

7. The reinforced coil spring, as claimed in claim 1, wherein the steel leaf spring and the outermost spring-coil are fixedly connected through one or a plurality of rivets, wherein the positioning hole is a square hole, and wherein the positioning protrusion is square.

8. The reinforced coil spring, as claimed in claim 1, wherein an inner end tip of the coil spring is bent to form a book head.

9. The reinforced coil spring, as claimed in claim 1, wherein an outer end tip of the steel leaf spring is bent to form an ear hook reinforced portion, and wherein an inner surface of the ear hook reinforced portion closely fits an outer surface of the ear book.

10. The reinforced coil spring, as claimed in claim 1, wherein a round fixed end tip used to be in insertion fit with a fixed shaft is formed at an inner end of the coil spring, wherein an inner end tip of the coil spring is bent to form a hook head, wherein the hook head comprises a flat plate, wherein the flat plate is located on a diameter line of the round fixed end tip, wherein a gap is reserved between an outer end surface of the flat plate and the center of a circle of the round fixed end tip, the flat plate and a groove of the fixed shaft being in concave, andconvex fit after the fixed shaft is in insertion fit and the round fixed end tip.

11. The reinforced coil spring, as claimed in 1, wherein an outer end tip of the steel leaf spring and the outermost spring-coil are fixedly connected through a fastener; and wherein a steel leaf spring extension section with a certain length is reserved between a fixed position of the fastener and the outer end surface of the steel leaf spring.

12. The reinforced coil spring, as claimed in claim 11, wherein the ear hook is comprised of an arc-shaped plate section and two flat plate sections, wherein the arc-shaped plate section is located between the two flat plate sections, and wherein the steel leaf spring extension section closely fits a back surface of one of the two flat plate sections.

13. The reinforced coil spring, as claimed in claim 11, wherein the steel leaf spring is provided with a plurality of first fixed points, wherein the back surface of the steel leaf spring is provided with a positioning protrusion, wherein the positioning protrusion is located among the plurality of first fixed points, wherein the outermost spring-coil is provided with a plurality of second fixed points, wherein the outermost spring-coil is provided with a positioning hole matched with the positioning protrusion, and wherein the positioning hole is located among the plurality of second fixed points.

\* \* \* \* \*